Feb. 15, 1966   D. T. HOSTETLER   3,235,078
OSCILLATING LIMESTONE SHAKER
Filed May 19, 1961   4 Sheets-Sheet 2
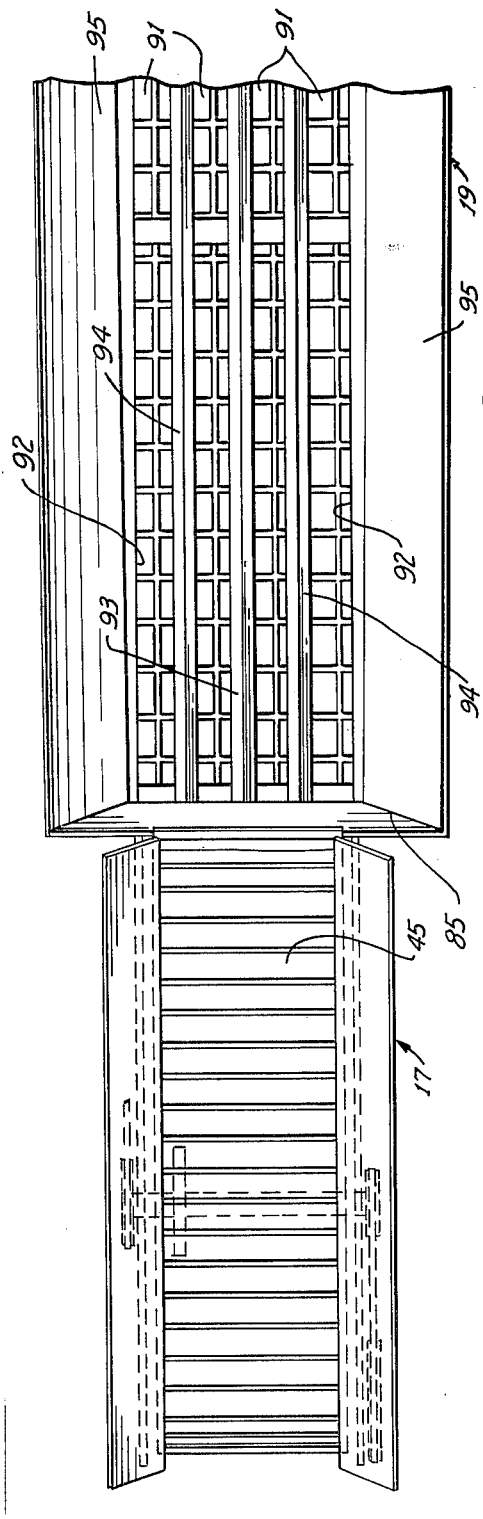
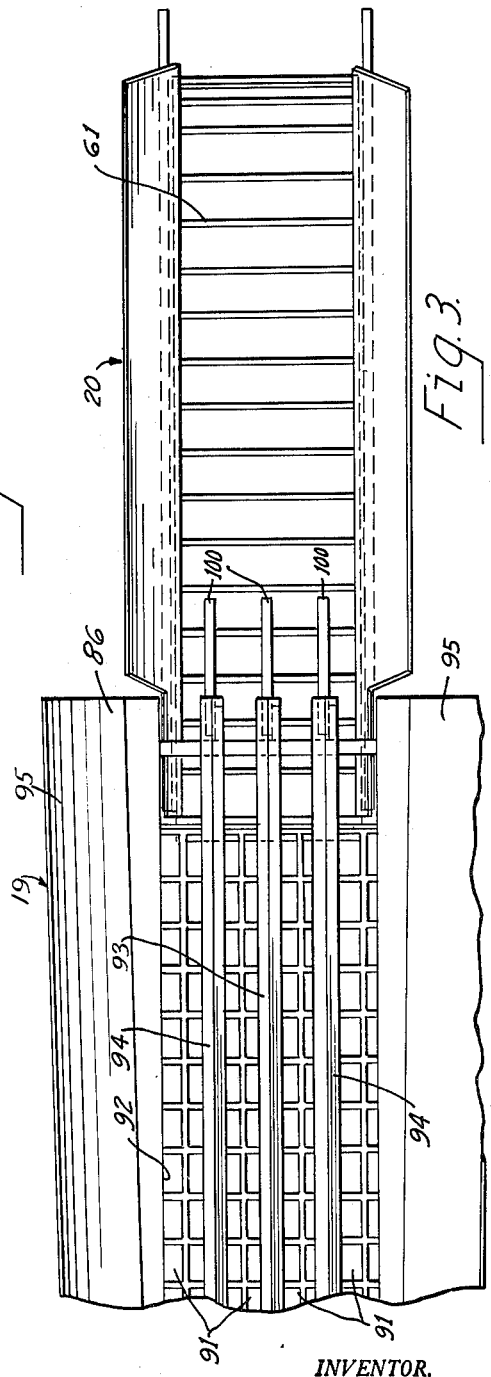
INVENTOR.
DANIEL T. HOSTETLER
BY Feb. 15, 1966     D. T. HOSTETLER     3,235,078
OSCILLATING LIMESTONE SHAKER
Filed May 19, 1961     4 Sheets-Sheet 3
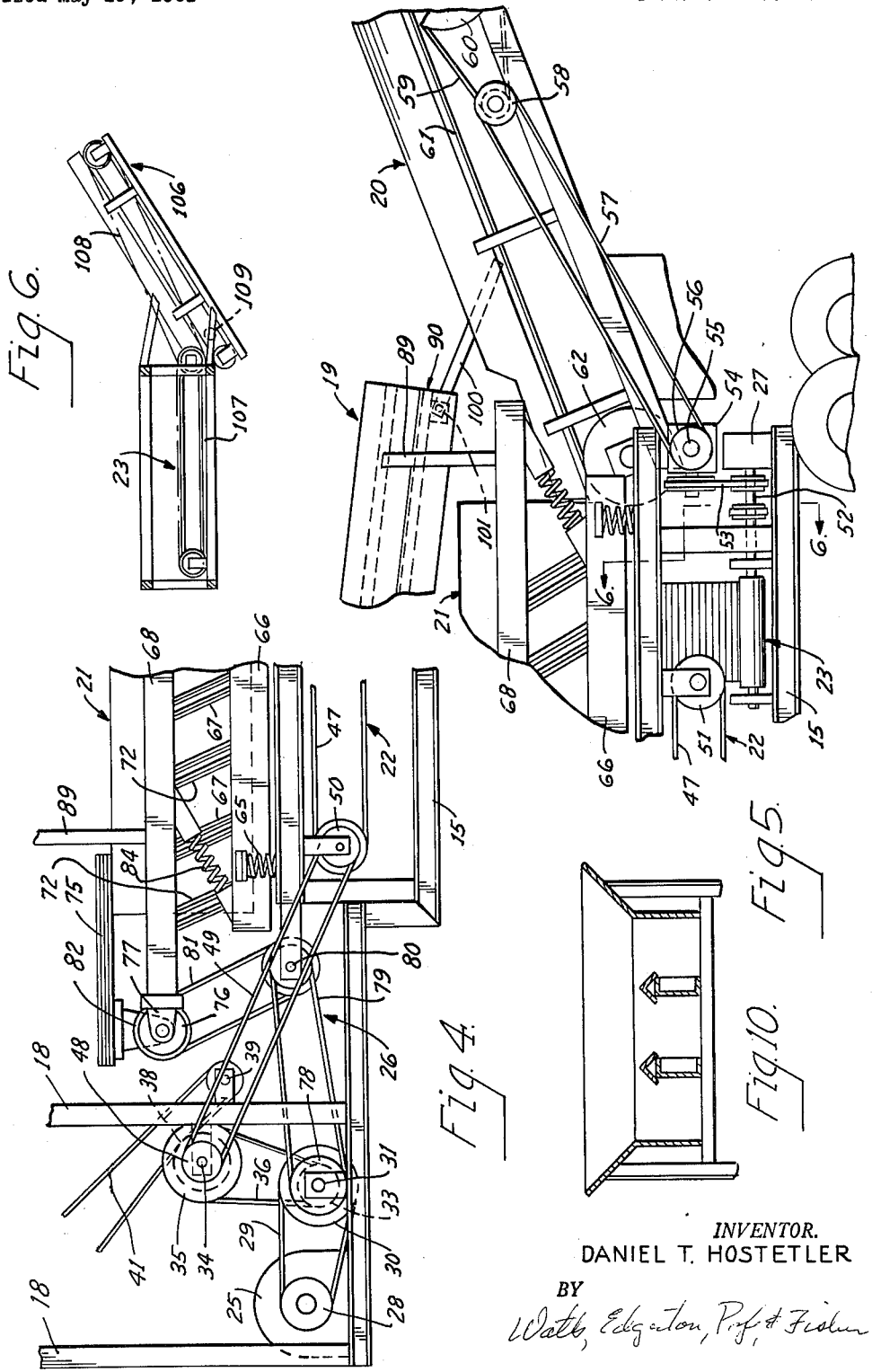
INVENTOR.
DANIEL T. HOSTETLER
BY Feb. 15, 1966 D. T. HOSTETLER 3,235,078
OSCILLATING LIMESTONE SHAKER
Filed May 19, 1961 4 Sheets-Sheet 4
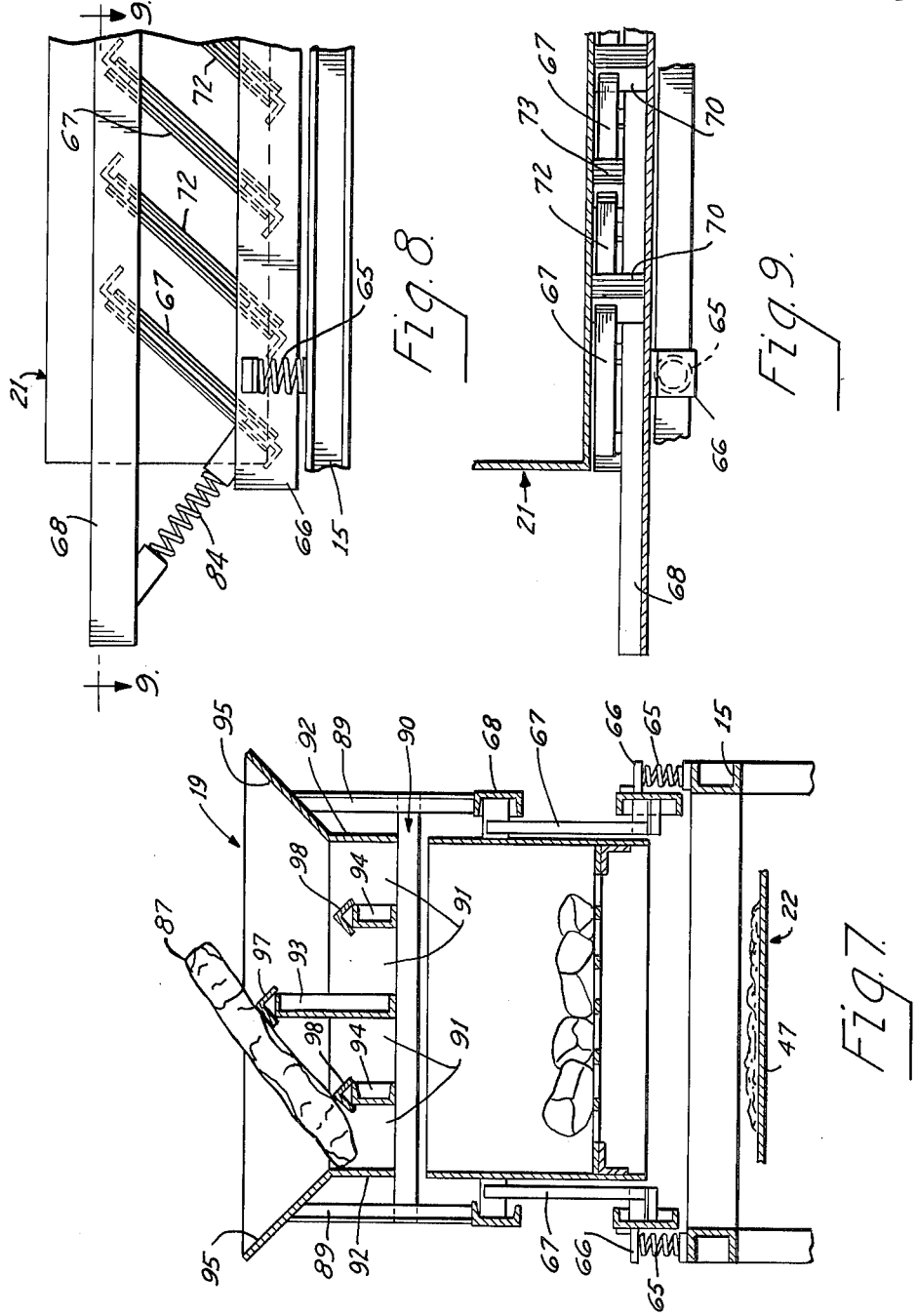
INVENTOR.
DANIEL T. HOSTETLER
BY United States Patent Office 3,235,078
Patented Feb. 15, 1966

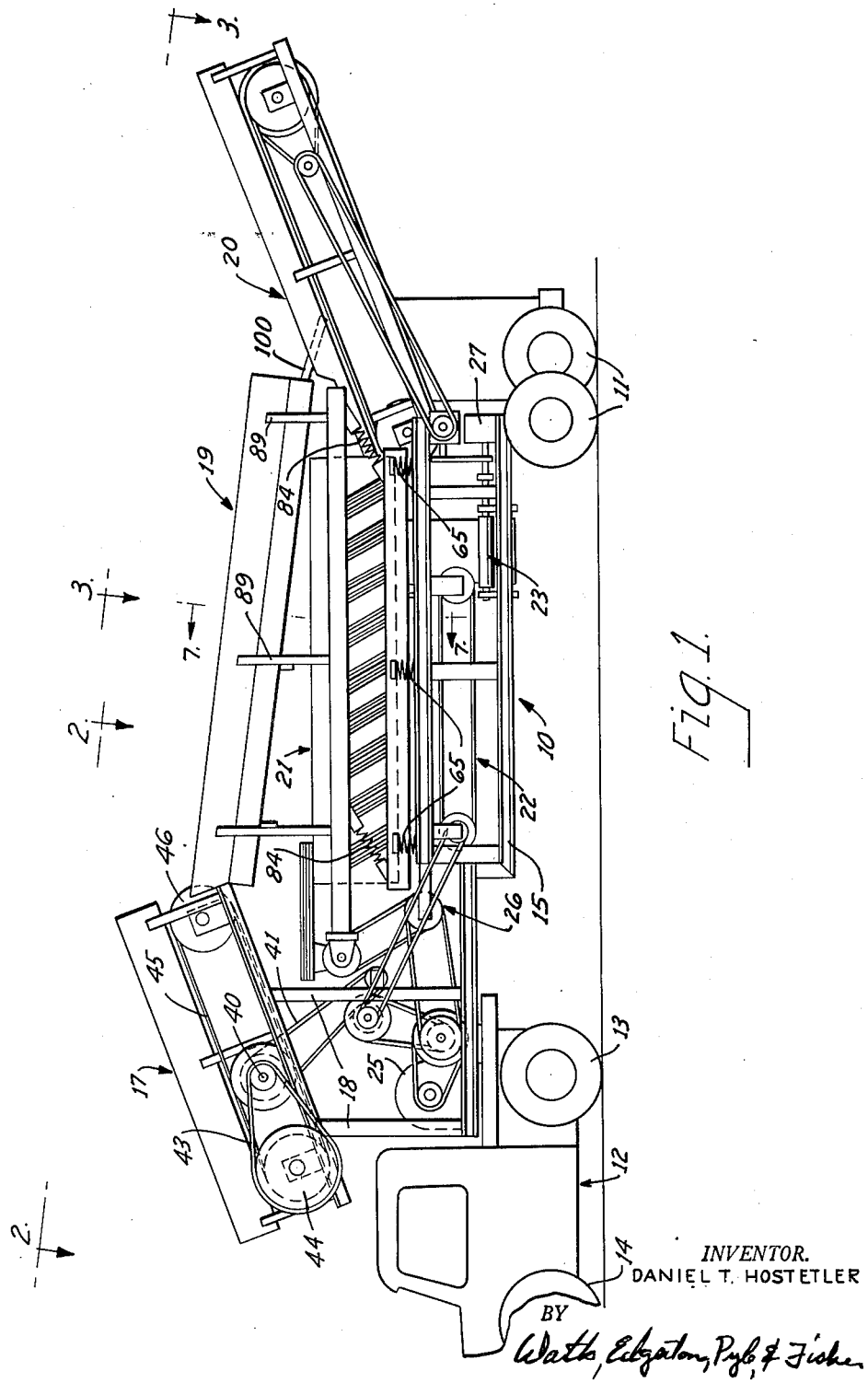

3,235,078
OSCILLATING LIMESTONE SHAKER
Daniel T. Hostetler, R.D. 1, Fredericksburg, Ohio
Filed May 19, 1961, Ser. No. 111,344
16 Claims. (Cl. 209—315)

This invention pertains to shaking mechanisms and more particularly to a mechanism which is especially suited for cleaning limestone.

Recoverable deposits of limestone are found in a number of states in the United States. In about one-half of these states these limestone deposits are accompanied by deposits of blue clay. When limestone is quarried from deposits where blue clay is present, such as those known as "out crop," it is essential that the quarried limestone be thoroughly cleaned and all blue clay be separated from it. Unless this blue clay is completely separated the stone is not commercially acceptable.

Blue clay clings tenaciously to limestone. In the past no satisfactory method or mechanism for separating blue clay from limestone has been known. All of the known apparatuses and techniques have either not sufficiently separated the limestone from the blue clay or have done so at a cost which is prohibitive because of competition from limestone quarried from deposits where there is no blue clay. The costs have, in fact, been so prohibitive that even though "out crop" stone is superior for some applications to limestone from solid veins, it still has not been commercially practical for use. This superiority exists in such applications as road fill and dirt road surfacing where the exceptional hardness of the "out crop" is an advantage.

The present invention solves these problems by providing a mechanism which conveniently, quickly and inexpensively separates blue clay and other foreign contaminants from limestone. The mechanism of this invention also separates fine-sized particles of limestone from usable pieces of limestone. This separation is accomplished with a relatively compact and portable unit which can be transported easily to a quarry and from place to place in a quarry.

The improved mechanism includes a bed supported on suitable road wheels. The bed supports a pair of sets of heavy supporting springs. The springs of each set are arranged in first and second groups. The springs in each group are in aligned relationship along a side of the bed. A mesh screen is supported above the bed by the two groups which constitute one set of springs. A separator known as a grizzly is positioned above the screen and supported by the other set of springs. An eccentric is connected to both the screen and the grizzly to cause the two to oscillate simultaneously in opposite directions in a balanced fashion, and against the action of the supporting springs. When "out crop" and similar limestone is quarried it is shoveled from the ground along with the surrounding clay. The pieces of limestone so quarried are often relatively thin, flat members. Method-wise, the key to the thorough and positive separation obtained in this invention resides in maintaining the large pieces of limestone in a position such that they are always standing on edge. Thus, if the piece is a flat piece such as a rectangular solid, no flat surface can be horizontal as the piece is shaken and gradually moved along the grizzly by the combined action of the oscillation and gravity. With the limestone so positioned as it is vigorously shaken by the oscillating grizzly the blue clay is thoroughly and completely separated.

Article-wise, this improved cleaning ability is obtained, at least in part, through the unique construction of a grizzly. The grizzly is composed of a frame which is generally rectangular in shape defining an elongated opening. In the preferred arrangement through longitudinally extending rails are provided which separate this opening into spaced and parallel slots. Each of these rails has upper walls that taper upwardly and inwardly to a peak so that the sections of limestone will not ride along the top of the rail but rather will slide off onto an adjoining slot. Inclined side walls are secured to the sides of the frame. These walls extend upwardly and flare outwardly. After limestone is deposited on the side walls, it is gravity fed, at an angle, onto the rails. The side walls also gradually taper away from one another toward the outlet end so that the angle of inclination of any surface of a piece of limestone being cleaned gradually changes as the piece advances from the supply end toward the outlet end of the grizzly.

This invention has, then, as one of its principal objects, the provision of a novel and improved method for cleaning and grading quarried pieces of limestone or the like.

Another of the principal objects of the invention is to provide a novel and improved mechanism for cleaning and grading limestone and similar materials which mechanism includes a grizzly constructed to position pieces being cleaned and graded on edge and thereby maintain the surfaces being cleaned at an angle with the horizontal.

Another object of the invention is to provide a lightweight and portable mechanism for grading and cleaning limestone and similar materials which mechanism includes a grizzly and a screen and a means to oscillate the two in equal and opposite directions in order that the screen and grizzly oscillations counterbalance one another.

Other objects and a fuller understanding of the invention may be had by referring to the following description and claims taken in conjunction with the accompanying drawings in which:

In the drawings:

FIGURE 1 is a side elevational view of the improved limestone cleaning mechanism of this invention;

FIGURE 2 is a top plan view, on an enlarged scale with respect to FIGURE 1 of a material supply conveyor and the inlet end of the limestone cleaning and separating mechanism as seen from the plane indicated by the line 2—2 of FIGURE 1;

FIGURE 3 is a top plan view of the outlet end of the limestone cleaning and separating mechanism and an outlet conveyor for the cleaned limestone on the scale of FIGURE 2 and as seen from the plane indicated by the line 3—3 of FIGURE 1;

FIGURE 4 is a fragmentary side elevational view on an enlarged scale with respect to FIGURE 1 and showing the motor and associated conveyor drive mechanisms;

FIGURE 5 is a fragmentary side elevational view on the scale of FIGURE 4 showing the outlet end of the limestone cleaning and separating mechanism and the outlet conveyor;

FIGURE 6 is a schematic sectional view of two mud and contaminant transferring conveyors as seen from the plane indicated by the line 6—6 of FIGURE 5 and on a reduced scale with respect to FIGURE 5;

FIGURE 7 is a sectional view of the grizzly and the screen as seen from the plane indicated by the line 7—7 of FIGURE 1 and on an enlarged scale with respect to that figure;

FIGURE 8 is an enlarged fragmentary side elevational view of part of the grizzly and screen support mechanism;

FIGURE 9 is a fragmentary sectional view of the device as seen from the plane indicated by the line 9—9 of FIGURE 8; and FIGURE 10 is a sectional view of a modified grizzly.

Referring now to the drawings and to FIGURE 1 in particular, the improved limestone cleaning and separating mechanism is shown generally at 10. The mechanism 10 takes the form of a specialized truck trailer having suitable road wheels 11. The trailer is connected to a tractor 12 in the usual manner. The tractor 12 is equipped with the usual drive and steering wheels 13, 14.

The trailer 10 includes a base frame 15 upon which the various conveyors, oscillating members, and the drive mechanisms are supported. These mentioned conveyors include a supply conveyor or feeder shown generally at 17. The supply conveyor 17 is supported on vertical portions 18 of the base frame 15. The supply conveyor 17 is positioned at the front of the trailer 10 extending partly over the cab of the tractor 12 and slanting upwardly and rearwardly. A limestone-clay mixture deposited on the supply conveyor 17 is fed to a grizzly shown generally at 19. Large pieces of limestone pass along the grizzly 19 and onto an outlet conveyor or feeder shown generally at 20. The outlet conveyor 20 conveys cleaned pieces of limestone upwardly and rearwardly to deposite them in a truck which may be positioned beneath the rearward or outlet end of the outlet conveyor 20.

A screen 21 is positioned beneath the grizzly 19. The screen 21 receives everything which passes through the grizzly 19 including medium-size and usable pieces of limestone, clay, and contaminants. The screen separates the clay and contaminants from the medium-size pieces depositing the clay and contaminants from the medium-size pieces depositing the clay and contaminants on a mud conveyor shown generally at 22. The medium-size pass from the screen 21 onto the outlet conveyor 20. The mud and contaminants are deposited on the mud cross conveyor shown generally at 23.

The transfer conveyor deposits the mud and contaminants on a mud removal conveyor 106, FIGURE 6. The conveyor 106 is pivotally connected at 109, FIGURE 6, to the side of the frame 15 so that it may be shifted to a vertical out-of-the-way position for transportation of the assembly.

An internal combustion engine 25 is mounted on the forward part of the base frame 15, beneath the supply conveyor 17. The engine 25 is connected, through a power transmission system shown generally at 26, to the supply conveyor 17, the grizzly and shaker 19, 21 and the mud conveyor 22. However, for clarity of detail, the mud conveyor 23 is shown as driven by a second internal combustion engine 27. This second engine 27 also drives the outlet conveyor 20.

As is best seen in FIGURE 4, the engine 25 has a motor pulley 28 on its output shaft. A belt 29 connects the motor pulley 28 to a larger, main idler drive pulley 30. The larger pulley 30 drives a main idler shaft 31 to which it is connected, as seen in the background of FIGURES 1 and 4. The main idler shaft 31 is journaled in the base frame 15. A main conveyor drive pulley 33 is connected to the main idler shaft 31 at its longitudinal center. A conveyor idler shaft 34 is journaled in suitable brackets on the rearward ones of the vertical risers 18. Another main conveyor drive pulley 35 is fixed to the conveyor idler shaft 34 near its longitudinal midpoint. A main conveyor drive belt 36 is reeved over the main conveyor drive pulleys 33, 35 to transport power from one to the other.

A feed conveyor drive sprocket 38 is connected to the end of the conveyor idler shaft 34 which is in the background in FIGURE 4. A feed conveyor idler shaft 39 is connected to the rearward of the vertical risers 18. A feed conveyor power transmission shaft 40 is journaled on the feed conveyor frame, FIGURE 1. A feed conveyor power transmitting belt or chain 41 is reeved over pulleys on the feed conveyor shafts 39, 40. The feed conveyor drive chain 41 is also reverse reeved over the sprocket 38 to form a driving connection between the conveyor idler shaft 34 and the chain 41.

A feed conveyor drive chain 43 drivingly connects the feed conveyor drive shaft 40 with a driven drum 44 at the forward end of the feed conveyor 17. A belt-type feed conveyor 45 is reeved over the driven drum 44 and an idler drum 46 journaled at the rearward end of the feed conveyor 17.

A mud drive sprocket 48 is connected to the end of the conveyor idlers shaft 34 which is in the foreground in FIGURE 4. A mud conveyor drive chain 49 connects the mud conveyor drive sprocket 48 with a driven drum 50 which forms part of the mud conveyor 22. Mud conveyor 22 also has a belt 47 which is reeved over the driven drum 50 and an idler drum 51 journaled toward the rearward end of the base frame 15.

The mud transfer conveyor 23, in the embodiment shown, is connected to the motor 27 by a drive shaft 52, FIGURE 5. The drive shaft 52 is also connected by a belt 53 to a gear box 54. The gear box 54 has an output shaft 55. The output shaft 55 carries an outlet conveyor drive sprocket 56. A chain 57 connects the outlet conveyor drive sprocket 56 with an outlet conveyor idler shaft 58. An outlet cnoveyor drive chain 59 connects the outlet conveyor idler shaft 58 with an outlet conveyor driven drum 60. An outlet conveyor belt 61 is reeved over the driven drum 60 and an idler drum 62. The driven drum 60 is at the outlet end of the outlet conveyor while the idler drum 62 is forward of and below the driven drum 60. The idler drum 62 is so positioned that the belt 61 is beneath the outlet end of both the grizzly 19 and the screen 21.

In the embodiment shown, the small motor 27 also drives the mud transfer conveyor 106. Chains 107, 108 connect the shaft 52 to the mud transfer conveyor to accomplish this drive of the latter.

A plurality of shock absorbing and supporting springs 65 are carried by the base frame 15. The shock absorbing springs 65 support a grizzly and screen bed 66. The bed 66 is a rectangular member which surrounds the screen 21. The bed 66 is supported along its sides at longitudinally spaced points by the shock absorbing springs 65, FIGURES 1 and 7.

A set of grizzly support leaf springs 67 are connected, at their respective bases, at longitudinally spaced locations along the sides of the bed 66. A rectangular grizzly base 68 surrounds the screen 21 and supports the remainder of the grizzly 19. The grizzly base 68 is fixed to the upper ends of grizzly support leaf springs 67 as by a bracket 70.

A plurality of screen support leaf springs 72 are provided. The screen support leaf springs 72 are identical to the grizzly support springs 67. The screen support springs 72 are also connected to the bed 66 at longitudinally spaced points along the sides. The screen support springs 72 are connected at their tops to the screen 21 as by brackets 73, FIGURE 9.

Each of the sets of leaf springs 67, 72, includes a group aligned along one side of the mechanism. The springs of each group alternate with springs of a group of the other set so that from front to rear, along each side of the trailer 10, first, third, fifth, seventh, etc. ones of the springs are screen support springs 72 and the alternate springs are the grizzly support springs, 67. Oppositely slanted snubber springs 84 are provided, FIGURES 1 and 8, which keep the screen and grizzly in an elevated condition even when heavy loads are imposed.

A stack of horizontally disposed ecentric drive leaf springs 75 are provided, FIGURE 4. The drive springs 75 are connected at one end to the screen 21. An eccentric 76 is connected to the forward end of the drive springs 75. The ecentric 76 is also connected to journal brackets 77. The journal brackets 77 are fixed to and form a part of the grizzly base 68.

The main idler shaft 31 has an eccentric drive pulley 78 in the foreground of FIGURE 4, the eccentric drive pulley 78 drives an eccentric idler belt 79 which in turn drives an eccentric idler shaft 80. The eccentric idler shaft 80 drives an eccentric drive belt 81. The eccentric drive belt 81 is reeved over an eccentric drive pulley 82. The eccentric drive pulley 82 is connected to the eccentric 76. As will become more apparent from the succeeding discussion, the eccentric drive pulley 82 will move relative to the base frame 15 when the mechanism is in operation. Accordingly, the eccentric idler shaft 80 is positioned such that the belt 81 parallels the leaf springs 67, 72. When the idler shaft is so positioned, the eccentric drive pulley 82 transcribes an arc about the axis of the shaft 80 when the mechanism is in use.

Since the eccentric is connected to the grizzly 19 and the bed screen 21, rotation of the eccentric will cause balanced and oppositely directed movement of the grizzly 19 and the screen 21. Thus, the entire grizzly assembly serves as a balance jack for the screen. The balanced and opposite movement will be against the grizzly and screen sets of support springs 67, 72 respectively. Because of the slant of the supporting spring 72, the screen, generally speaking, transcribes a rearwardly slated oscillating path. This action throws any material on the screen upwardly and rearwardly once each revolution of the eccentric.

Accordingly, pieces of limestone, clay and other contaminants dropping on the screen are tumbled and shaken and thrown rearwardly by the screen movement. This movement shakes any clay from the pieces of limestone on the screen 21, causing it to drop through on the mud transfer conveyor 22.

The grizzly 19 is considerably heavier than is the screen 21. While there is a thorough and positive oscillation and shaking of all pieces on the grizzly 19, they are not thrown rearwardly as much as pieces on the screen 21 by the relatively more violent action of the screen 21. For this reason, the grizzly 19 is canted at an angle with the horizontal so that its inlet at end 85 is somewhat higher than the other or outlet end 86.

One of the outstanding advantages of the invention is obtained through the unique construction of the grizzly 19. The grizzly is so constructed that any relatively large pieces of limestone such as the piece designated at 87 in FIGURE 7, cannot lie flat. Since the limestone in its natural state, when mixed with blue clay, occurs in relatively thin veins, the large pieces are relatively thin and flat and flagstone-like in nature. Any pieces which are small enough will drop through the grizzly onto the screen. Any pieces too large to drop through the grizzly can only come to rest when standing on edge so that there are no horizontally disposed surfaces as the large pieces work their way along the grizzly from inlet to outlet 85, 86.

This objective is obtained by providing a rectangular frame 90. The rectangular frame 90 is connected by vertical frame elements 89 to the grizzly bed 68. The rectangular frame 90 is canted at an angle with the horizontal and defines the peripheral limits of elongated rectangular opening. This rectangular opening is divided into a plurality, preferably 4, of long thin, longitudinally extending slots 91. These slots 91 have their transverse extremities defined by side walls 92, a central rail 93 and a pair of intermediate rails 94. The side walls 92 form a part of the frame 90. The rails 93, 94 are longitudinally extending members which run from one end of the grizzly to the other.

The side walls 92 include upwardly and outwardly flaring portions 95. These flaring portions 95 are the uppermost portions of the side walls 92. They are canted at an angle such that a downward and inward extension of the flaring portions 95 will in each case intersect the nearest intermediate rail 94. A piece of limestone deposited on the side walls 95 by the supply conveyor 17 will slide down and against the intermediate rails 94. If the piece is small it will drop through the slot 91 defined by the side wall 92 and the adjacent intermediate rail 94. If it is large, it will remain at an angle.

An inverted angle 97 is fixed to and forms a part of the central rail 93, FIGURE 7. Similarly, inverted angles 98 are fixed to and form the part of each of the intermediate rails 94. The tops of the rails, then, are each in the shape of an inverted V. Any piece of limestone dropped by the supply conveyor 17 onto the top of one of the rails will teeter and slide to one side or the other. A large piece dropped on the central rail 93 for example may, if it is small, drop through an adjoining slot 91. It may slide against the intermediate rail 94 or more commonly over the adjoining intermediate rail and against the side wall 92. Similarly, pieces deposited on the intermediate rails 94 will teeter and either drop through the adjoining slot 91 or slide, at an angle, against the central rail 93 or the adjacent side wall 92.

With the described arrangement there is no way for a large piece of limestone to find a resting spot in which a flat surface is horizontal. Further, in the preferred arrangement, the side walls flare away from one another from inlet 85 to the outlet 86. This flare is obscured by the drawings because the flare is gradual and the drawings are, of necessity, on a very small scale. Since most large pieces will be either lying along the flaring portions 95 of the sidewalls and resting against one of the rails, or supported by one of the rails and abutting the side walls, this divergence of the side walls gradually changes the position of large limestone pieces, relative to the horizontal, as the pieces advance towards the outlet 86. This change of position assures the positioning of all surfaces at something other than horizontal at some time during the travel from inlet to outlet.

After the large pieces of limestone have traveled the length of the grizzly they slide down one or more of three gate rails 100, FIGURES 3 and 5, onto the outlet conveyor 20. The gate rails are hinged to the grizzly at 101, FIGURE 5, and rest at their lower end against the supply conveyor 20. Small pieces of limestone coming off the screen 21 and onto the supply conveyor 20 will pass upwardly, raising the gates 100 to pass by them. At the same time, the presence of the gates 100 allows the large pieces to slowly slide down onto the outlet conveyor 20, avoiding the dropping of these large pieces onto the outlet conveyor.

In FIGURE 10 an alternate two-railed grizzly is shown. There, the central rail 93 is eliminated and only the two intermediate rails 94 are used. This is a very successful construction for a slightly smaller grizzly than that described in the preferred arrangement. Tests have indicated, however, that the preferred arrangement does give results superior to this two-railed alternate.

*Operation*

In operation, a power shovel is used to deposit a mixture of limestone and clay onto the supply conveyor 17. This limestone-clay mixture may be from the so-called "out crop" or other deposit relatively near the surface of the earth. The mixture is conveyed onto the grizzly 19. The oscillation of the grizzly causes clay, small pieces of limestone, and small pieces of contaminants to drop through the slot 91 onto the screen 21.

The large pieces of limestone pass, through the combined action of gravity and the oscillation of the grizzly, along the grizzly to the outlet 86. During this passage, substantially all mud and contaminants are shaken loose and pass through the slots 91.

As the large pieces are passing along the grizzly, smaller pieces are tumbled on the screen 21 separating them from mud and contaminants. The mud and contaminants on the other hand pass through the screen 21 onto the mud conveyor 22. The mud conveyor 22 deposits the mud on the transversely disposed, transfer conveyor 23. The transfer conveyor 23 shifts the mud to the mud removal conveyor 106.

The large and small pieces of limestone pass from the grizzly 19 and the screen 21 onto the outlet conveyor 20 for transfer to a truck or the like. Mud, on the other hand, is transferred to the side of the trailer 10 by conveyor 106 so that it is piled in an out-of-the-way position. While this position is out of the way for operation of the vehicle, the mud is conveniently deposited in spaced piles for simple grading and restoration of the land after a quarrying operation has been completed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mechanism for separating foreign matter from limestone or the like comprising a bed, a screen supported on the bed for oscillation relative to the bed, a grizzly superimposed over the screen and supported by the bed for relative oscillation relative to both the bed and the screen, drive means connected to the screen and grizzly to cause such oscillation, said grizzly having a frame structure forming a base therefore and defining an elongated opening extending from a grizzly inlet to an outlet, at least one longitudinally extending rail secured to the frame and separating the opening into a plurality of elongated continuous slots extending substantially from the inlet to the outlet, said grizzly including a pair of spaced, tapered, feed side wall means, each side wall means being secured to the frame along a side thereof and flaring upwardly and outwardly at an angle and spaced from the rail such that any piece of limestone of a size too large to pass through one of said slots will be gravity fed down one of said side wall means and deposited with one surface in abutment with and at an angle with at least one such rail and with a side edge disposed in said slot, means defining an outlet collecting station to receive limestone output of both the grizzly and the screen and other means below the screen to receive clay separated by both the grizzly and the screen.

2. The mechanism of claim 1 wherein three rails are secured to the frame to divide the opening into four slots of substantially equal size and wherein the one of the rails is a central rail higher than the remaining rails substantially throughout its length.

3. The device of claim 1 wherein there are a pair of tapered side walls secured to opposite sides of the frame and extending longitudinally therefrom and spaced from one another to define the transverse limits of a material cleaning region and wherein said region has an outlet end and wherein the space between the walls increases as the outlet end is approached.

4. The device of claim 1 wherein the screen has an outlet and an outlet conveyor is positioned with an inlet below the screen outlet and wherein transfer rails are pivotally mounted on the grizzly and extend from the grizzly to the outlet conveyor.

5. The device of claim 1 wherein there are a plurality of springs secured to the bed along the sides thereof and spaced from one another, the screen is above the bed and supported by alternate ones of the springs along each side, the grizzly is above the screen and supported by the alternate and remaining springs and an eccentric means is connected to the screen and to the grizzly to cause oscillation thereof.

6. The device of claim 5 wherein counterbalance springs are secured to the grizzly and to the bed and wherein the counterbalance springs angle in one direction with respect to the bed and the grizzly and screen supporting springs angle in the opposite direction.

7. The device of claim 1 wherein said drive means comprises at least one drive spring secured to a selected one of the grizzly and screen, power driven eccentric means secured to the drive spring and to the other and unselected one of the screen and grizzly to apply equal and opposite oscillating forces yieldingly against said spring and thereby cause opposite balanced oscillations of the grizzly and screen.

8. A mechanism for cleaning limestone or the like comprising, a bed having first and second generally parallel and spaced sides, a plurality of springs secured to the bed along the sides thereof and spaced from one another, a generally rectangular screen above the bed and supported by alternate ones of the springs along each side, a grizzly above the screen and supported by the alternate and remaining springs, eccentric means connected to the screen and to the grizzly to cause oscillation thereof in opposite directions, said grizzly including a generally rectangular frame defining an elongated opening extending from a supply end to an outlet end, a plurality of rails secured to the frame and dividing the opening into a plurality of longitudinally extending slots, each extending substantially from the inlet to the outlet end, each of said rails having tapered side walls intersecting at a peak such that a cross section of the upper portion of the rail is in the shape of an inverted V in cross section, said grizzly also including a spaced pair of side walls secured to the frame along the sides of the opening and flaring upwardly and outwardly away from one another, the spacing between said side walls gradually increasing from the supply to the outlet end, means defining an outlet collecting station to receive limestone output of both the grizzly and the screen and other means below the screen to receive clay separated by both the grizzly and the screen.

9. A separating mechanism for limestone or the like comprising, a bed, first and second sets of springs secured to the bed, each of said sets having a first group of springs arranged in aligned relationship along one side of the bed and a second group arranged in aligned relationship along the other side of the bed, a vibratory screen carried by the first set of springs for separating medium sized pieces of the material being separated and graded from fines and contaminants, a grizzly including a frame having a suport portion connected to the second group of springs and surrounding the screen, said frame including a rectangular portion carried above the support portion and at an angle with it, the rectangular portion defining an elongated rectangular opening; said grizzly rectangular portion being positioned above the screen for separating large sized pieces of the material being separated and graded from such medium sized pieces, fines and contaminants; said grizzly including three spaced and parallel longitudinally extending rail means secured to the rectangular portion and dividing the opening into a plurality of parallel slots, said grizzly also including spaced side wall means secured to the sides of the frame rectangular portion and flaring upwardly and outwardly away from one another, said rail and side wall means together defining said slots of a size such that any piece of limestone of a size too large to pass though one of said slots will be gravity-fed down one of said side walls and deposited in abutment with and at an angle with at least one such rail and with the wide edged disposed in one of said slots, eccentric means connected to the screen and the grizzly to cause simultaneous oscillation of both relative to the frame and relative to one another in opposite directions, means defining an outlet collecting station to receive limestone output of both the grizzly and the screen and other means below the screen to receive clay separated by both the grizzly and the screen.

10. A limestone separating device comprising:
   (a) a bed;
   (b) a screen mounted on the bed for oscillation, and extending to a discharge end;
   (c) an oscillatable grizzly above the screen and including elongated rail means and side wall means, said rail and side wall means together defining slots sized to pass only those pieces of limestone small enough to be tumbled and cleaned by the screen, said rail and side wall means being slanted and spaced to maintain the remaining pieces canted;

(d) said grizzly being sloped to a discharge end;
(e) oscillating means connected to the grizzly and screen to cause opposite oscillation of the two;
(f) a collection conveyor below and paralleling the screen, said collection conveyor including a discharge end; and,
(g) a contaminating material discharge conveyor transverse to the screen and positioned in part beneath the discharge end of the collection conveyor for delivering contaminating material from the collection conveyor to an outlet of the discharge conveyor.

11. A limestone separating mechanism comprising:
(a) a vehicle frame structure mounted on wheels and adapted to be connected to a tractor or the like;
(b) a mud conveyor mounted on the vehicle frame near the base thereof and adapted to receive and transport mud and other contaminants separated from limestone;
(c) transfer conveyor means mounted on said frame rearwardly of the mud conveyor and below an outlet end of said mud conveyor;
(d) a screen yieldably mounted on said vehicle frame above said mud conveyor and adapted to be oscillated longitudinally of said vehicle frame;
(e) a grizzly assembly including a base frame portion surrounding said screen and yieldably mounted on said frame for oscillating movement longitudinally of said vehicle frame;
(g) said grizzly including a separating frame portion of generally rectangular configuration supported above said base frame and said screen in canted relationship thereto;
(g) said grizzly having a plurality of longitudinally extending rail and side wall means defining a plurality of generally parallel longitudinally disposed slots extending substantially from an inlet to an outlet, said slots defined by said rail and side wall means being of a size to pass only those pieces of limestone small enough to be tumbled and cleaned by the screen, said rail and slide wall means being slanted and spaced to maintain the remaining pieces canted;
(h) an eccentric connected to both said grizzly and said screen to cause opposite and simultaneous longitudinal oscillations thereof;
(i) a supply conveyor mounted forwardly of said vehicle frame and having a discharge end above said grizzly to supply contaminated limestone to said grizzly;
(j) a discharge conveyor mounted rearwardly on said vehicle frame and positioned to receive the discharge of both said screen and said grizzly; and,
(k) transfer rails pivotally connected to said grizzly rails and abuttable against said discharge conveyor whereby large pieces of limestone discharged by the grizzly are slidably transported to the discharge conveyor and smaller pieces discharged by the screen can pass under said transfer rails.

12. The device of claim 11 wherein a single prime mover is connected to and drives said grizzly said screen and each of said conveyors.

13. The method of cleaning limestone or the like which method comprises:
(a) depositing a quantity of material to be cleaned and graded on an oscillating grizzly;
(b) allowing pieces of the material of less than a predetermined size to pass through slots in the grizzly onto a screen;
(c) collecting the smaller pieces on the screen while shaking the screen to allow clay and contaminants to pass therethrough and simultaneously transport the collected smaller pieces to an outlet end of the screen;
(d) maintaining all pieces of a size larger than the predetermined size in a cocked position on the grizzly while oscillating the grizzly to slide and shake such larger pieces to separate other materials from such pieces larger than said predetermined size without tumbling said larger pieces while simultaneously transporting said larger size pieces to an outlet end of the grizzly; and,
(e) collecting the piece output of the screen and grizzly.

14. The method of claim 13 wherein the amount of cocking of said pieces is varied as the large pieces are moved from a suply end to an outlet end of the grizzly.

15. The method of claim 13 wherein the collected piece output of the screen and grizzly is commingled.

16. The method of preparing limestone or the like which method comprises:
(a) quarrying limestone in pieces of a generally flat shape;
(b) separating pieces small enough to tumble from larger size pieces; and,
(c) separating foreign materials from each of said larger size pieces by maintaining each of said larger pieces on edge with all surfaces at an angle with the horizontal, and shaking each such larger size piece while so maintained on edge to separate said foreign materials from each of said larger size pieces.

References Cited by the Examiner
UNITED STATES PATENTS

| | | | |
|---|---|---|---|
| 1,216,798 | 2/1917 | Green | 209—393 |
| 1,876,460 | 9/1932 | Knipple | 209—420 |
| 2,107,729 | 2/1938 | Denovan | 209—329 |
| 2,132,165 | 10/1938 | Henry | 241—81 |
| 2,267,419 | 12/1941 | Oster | 209—257 |
| 2,285,678 | 6/1942 | Overstrom | 209—315 |
| 2,378,499 | 6/1945 | Rapp | 209—329 |
| 2,443,176 | 6/1948 | Banning | 209—395 |
| 2,660,835 | 12/1953 | Burden | 209—257 |
| 2,734,730 | 2/1956 | Talboys | 209—421 |
| 2,812,859 | 11/1957 | Frank | 209—393 |
| 3,016,203 | 1/1962 | Sears | 209—315 |

FOREIGN PATENTS

| | | |
|---|---|---|
| 537,756 | 10/1931 | Germany. |
| 12,414 | 5/1913 | Great Britain. |
| 538,063 | 7/1941 | Great Britain. |

OTHER REFERENCES

U.S. Bureau of Mines, Information Circular 7917, pp. 1–22, 1959.
U.S. Bureau of Mines, Technical Paper No. 203, Mineral Technology 24, 1919, page 16.
Roads and Streets, vol. 101, November 1958, page 143.

HARRY B. THORNTON, *Primary Examiner.*

HERBERT L. MARTIN, EDWARD H. MICHAEL,
*Examiners.*